US012704764B2

(12) United States Patent
Radnaev

(10) Patent No.: US 12,704,764 B2
(45) Date of Patent: Aug. 11, 2026

(54) QUANTUM-STATE READOUT USING FOUR-WAVE MIXING

(71) Applicant: ColdQuanta, Inc., Boulder, CO (US)

(72) Inventor: Alexander Georgiyevich Radnaev, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 1324 days.

(21) Appl. No.: 17/499,999

(22) Filed: Oct. 13, 2021

(65) Prior Publication Data

US 2022/0171256 A1 Jun. 2, 2022

Related U.S. Application Data

(60) Provisional application No. 63/119,728, filed on Dec. 1, 2020.

(51) Int. Cl.

*G02F 3/00* (2006.01)
*G02F 3/02* (2006.01)
*G06N 10/40* (2022.01)

(52) U.S. Cl.

CPC .................. *G02F 3/00* (2013.01); *G02F 3/02* (2013.01); *G06N 10/40* (2022.01)

(58) Field of Classification Search

CPC .. G02F 3/00; G02F 3/02; G06N 10/00; G06N 10/40; G06N 10/70

See application file for complete search history.

(56) References Cited

U.S. PATENT DOCUMENTS 10,504,033 B1 12/2019 King
2006/0092500 A1* 5/2006 Melloni ................ G02F 1/3536 359/330
2008/0231837 A1 9/2008 Ichimura
2015/0055961 A1* 2/2015 Meyers .................. G06N 10/00 398/140
2019/0164607 A1 5/2019 Kaczmarek
2019/0187380 A1* 6/2019 Fanto ....................... G02B 6/12

(Continued)

FOREIGN PATENT DOCUMENTS

WO 2020068237 A1 4/2020

OTHER PUBLICATIONS

Dudin et al., Entanglement of a Photon and an Optical Lattice Spin Wave, PRL 103, 020505 (2009), week ending Jul. 10, 2009. 2009 The American Physical Society, pp. 020505-1-020505-4.

(Continued)

*Primary Examiner* — William R Alexander
*Assistant Examiner* — Gabriel A Sanz
(74) *Attorney, Agent, or Firm* — Michael J. Attisha; Greenberg Traurig, LLP

(57) ABSTRACT

Quantum state readout is achieved using four-wave mixing. A quantum-state carrier, e.g., a cesium 133 atom, is illuminated with a set of three wavelengths. In the event that the atom is in a first quantum state, e.g., an F=3 state of cesium 133, the illumination triggers emission in a first direction from the atom of a fourth wavelength due to four-wave mixing. Detection of the emission in the first direction thus indicates that the atom is in the first quantum state. In an embodiment, failure to detect an emission indicates the atom is in a second quantum state. In other embodiments, a second set of three wavelengths is used to provide a positive indication that the atom is in its second state, e.g., an F=4 state for cesium 133.

16 Claims, 6 Drawing Sheets

(56) References Cited

U.S. PATENT DOCUMENTS

2020/0116623 A1* 4/2020 Cooper-Roy .......... G06N 10/70
2020/0185120 A1* 6/2020 Keesling Contreras ..................... G21K 1/006
2020/0274703 A1 8/2020 Lukens et al.
2021/0116782 A1* 4/2021 Suchowski ........... G02F 1/3509
2023/0418128 A1 12/2023 Radnaev

OTHER PUBLICATIONS

Jablonski, Energy Level Diagrams the Four Wave Mixing Process of Coherent anti Stokes, Mar. 2013.
Ketterle et al., High Densities of Cold Atoms in a Dark Spontaneous-Force Optical Trap, Physicals Review Letters, vol. 70, No. 15, Apr. 12, 1993, pp. 2253-2256.
Pritchard et al., Light Traps Using Spontaneous Forces, Physical Review Letters, vol. 57, No. 3, Jul. 21, 1986, 1986 The American Physical Society, pp. 310-313.
Radnaev et al., A Quantum Memory with Telecom-Wavelength Conversion, Nature Physics, Published Online, Sep. 26, 2010, vol. 6, Nov. 2010, pp. 894-899.
European Search Report in European International Application No. EP 21 90 1290 mailed Sep. 9, 2024.

* cited by examiner

| | N | ? | Y |
|---|---|---|---|
| N | ϵ | ϵ | F4 |
| ? | ϵ | ϵ | ϵ |
| Y | F3 | ϵ | ϵ |

QUANTUM-STATE READOUT USING FOUR-WAVE MIXING

BACKGROUND OF THE INVENTION

Whereas classical digital computers manipulate units, e.g., bits, of classical information, quantum computers manipulate units, e.g., qubits, of quantum information. Both classical bits and quantum qubits can be represented physically using two-state carriers. Examples of two-state quantum carriers include an electron that can assume a spin up and a spin down state, and an electron in an atom that can assume either of a ground state or an excited state. A classical two-state carrier assumes one of the two states at any given time; a quantum two-state carrier can be in a quantum superposition of both states simultaneously.

Once a quantum computation complete, the results can be read out. Regardless of the underlying quantum technology (e.g., superconducting circuits, ions, cold-neutral atoms), superposition states collapse to non-superposition states on a probabilistic basis. In effect, qubits are reduced to bits. Thus, the objective is to determine the non-superposition state of each quantum-state carrier.

For example, in the case that the quantum carriers are cold neutral cesium 133 atoms, readout can involve determining which atoms are in an F=3 state of ground manifold (e.g., representing a logic 0) and which atoms are in an F=4 state (e.g., representing a logic 1), where F denotes full angular momentum of an atom. One way to do this is to illuminate the atoms with light of a wavelength that will cause atoms in the F=3 state, but not atoms in the F=4 state, to fluoresce. Fluorescence detection can then be used to identify the atoms in the F=3 state, while the remaining atoms are assumed to be in the F=4 state.

A challenge facing fluorescent readout is obtaining strong fluorescent signal-to-noise ratios to achieve good readout performance. What is needed is a readout approach that achieves a higher signal-to-noise ratio than existing quantum-state readout approaches.

DETAILED DESCRIPTION

Figure 1:
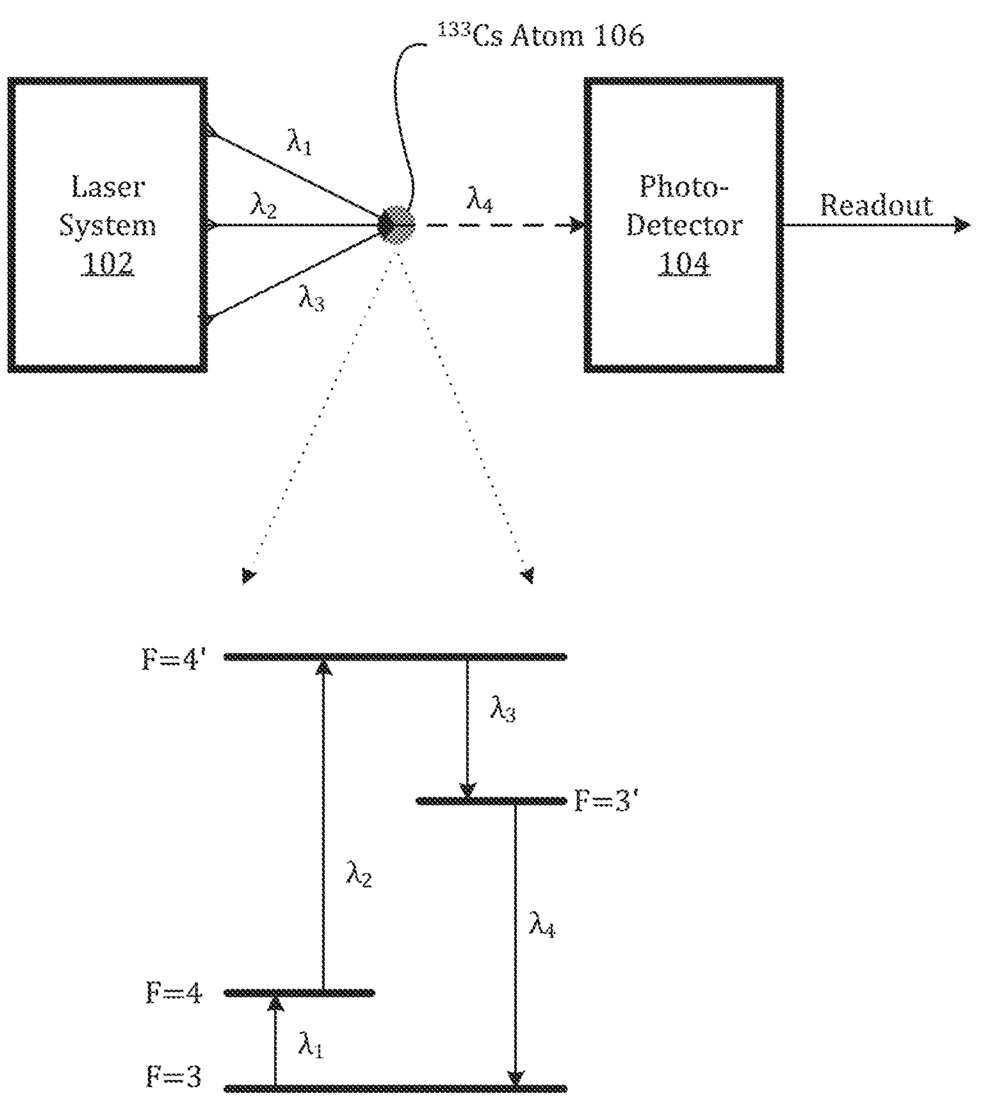
FIG. 1 is a schematic illustration of a quantum-state readout system based on four-wave mixing.

The present invention provides for quantum-state readouts using four-wave mixing to achieve readouts with high signal-to-noise ratios. In an embodiment, a quantum-state readout system includes a laser system 102 and a photodetector 104. The quantum-state carrier (QSC) to be read out is any system with non-linearity to support four wave mixing, for instance, a cold neutral cesium 133 ($^{133}$Cs) atom 106. Relevant quantum states of the $^{133}$Cs atom include an F=3 state (e.g., representing a logic 0) and an F=4 state (e.g., representing a logic 1), an excited F'=3 state and an excited F'=4 state.

Laser system 102 generates light of wavelengths $\lambda_1$, $\lambda_2$, and $\lambda_3$. Wavelength $\lambda_1$ is resonant with or detuned with respect to resonance with an F=3→F=4 transition of atom 106; thus, illumination of atom 106 in its F=3 state by wavelength $\lambda_1$ can cause a transition to the atom's F=4 state. Wavelength $\lambda_2$ is resonant with or detuned with respect to resonance with an F=4→F=4' transition of atom 106, and wavelength $\lambda_3$ is resonant with or detuned with respect to resonance with a F=4'→F=3' transition. In response to illumination by all three wavelengths $\lambda_1$, $\lambda_2$, and $\lambda_3$, atom 106 acts as a four-wave mixer and emits wavelength $\lambda_4$ as it executes an F=3'→F=3 transition. On the other hand, if it is in its F=4 state when illuminated by wavelengths $\lambda_1$, $\lambda_2$, and $\lambda_3$, atom 106 will not act as a four-wave mixer and will not emit a fourth wavelength. Therefore, in the event that photodetector 104 detects light emitted by atom 106, then it can be surmised that atom 106 was in its F=3 state and not in its F=4 state. On the other hand, in the event the detection event is negative, then it can be assumed, putting error conditions aside, that atom 106 was in its F=4 state when read.

Figure 2:
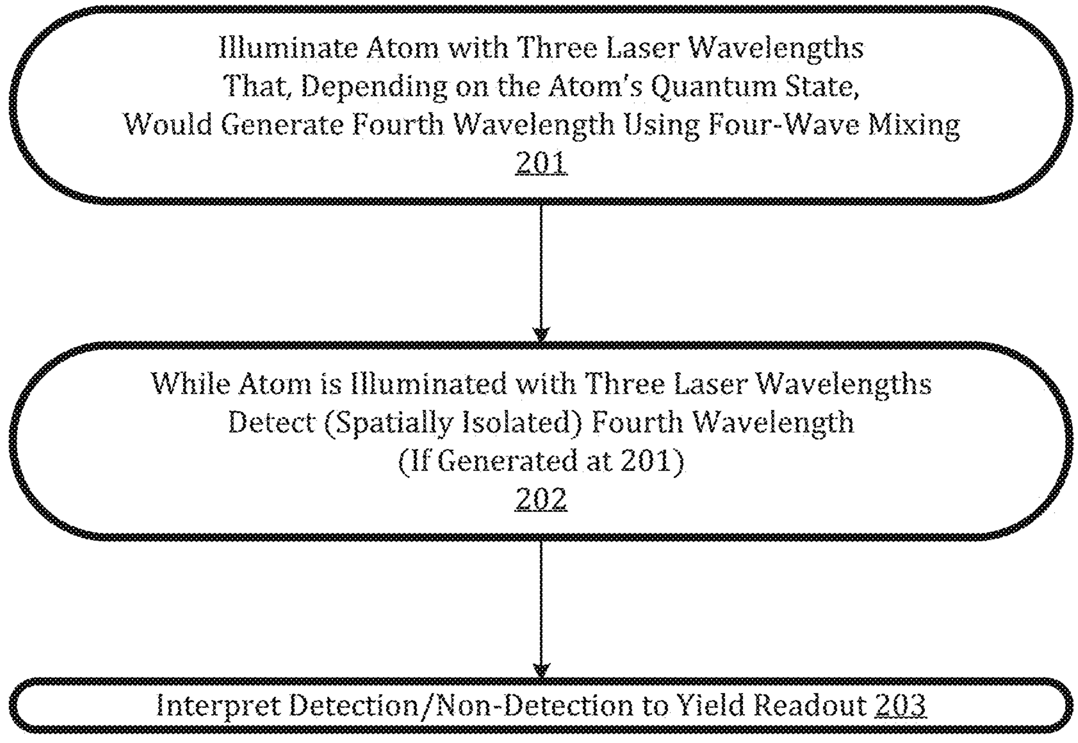
FIG. 2 is a flow chart of a quantum-state readout process implementable in the system of FIG. 1 and in other systems.
Figure 3:
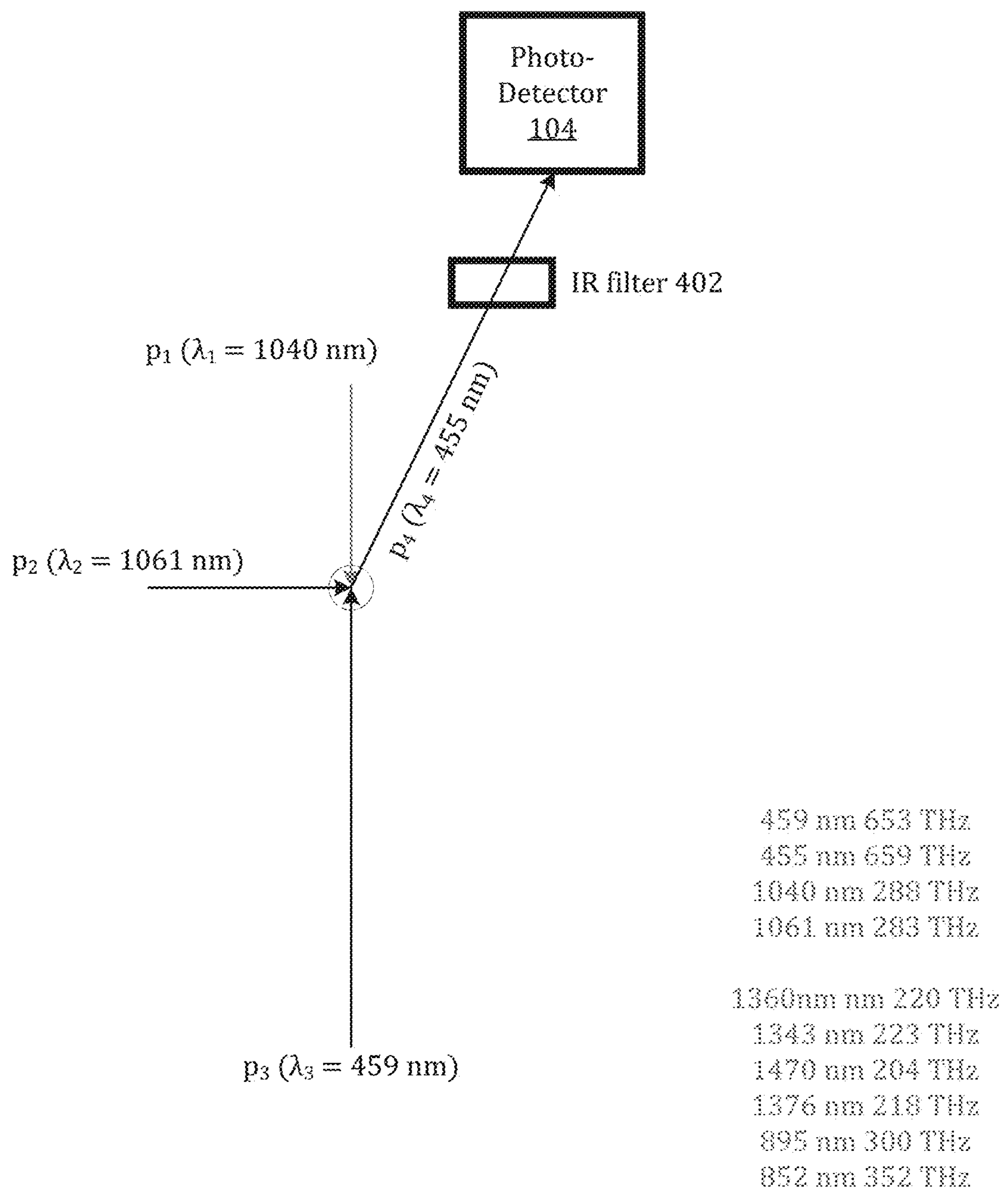
FIG. 3 is a schematic representation of an effect of conservation of momentum in the context of four-wave mixing readout.

A quantum-state readout process 200, implemented in quantum-state readout system 100 and other systems, is flow charted in FIG. 2. At 201, an atom is illuminated with three laser wavelengths that would, depending on the atom's quantum state, cause the atom to emit a fourth wavelength using four-wave mixing. For example, if the atom is a $^{133}$Cs atom, the three illumination wavelengths can be selected so that the fourth wavelength is generated using four-wave mixing if and only if (iff) the $^{133}$Cs atom had collapsed to its F=3 energy state.

At 202, an attempt is made to detect the fourth wavelength. Of course, if the atom is not in the correct quantum state, the fourth wavelength will not be generated and emitted and, thus, will not be detected. The attempt must be concurrent with the illumination of the three wavelengths; as soon as one or more of the three wavelengths is switched off, the generation of the fourth wavelength terminates. At 203, the detection or non-detection is interpreted to yield a result readout.

Figure 4:
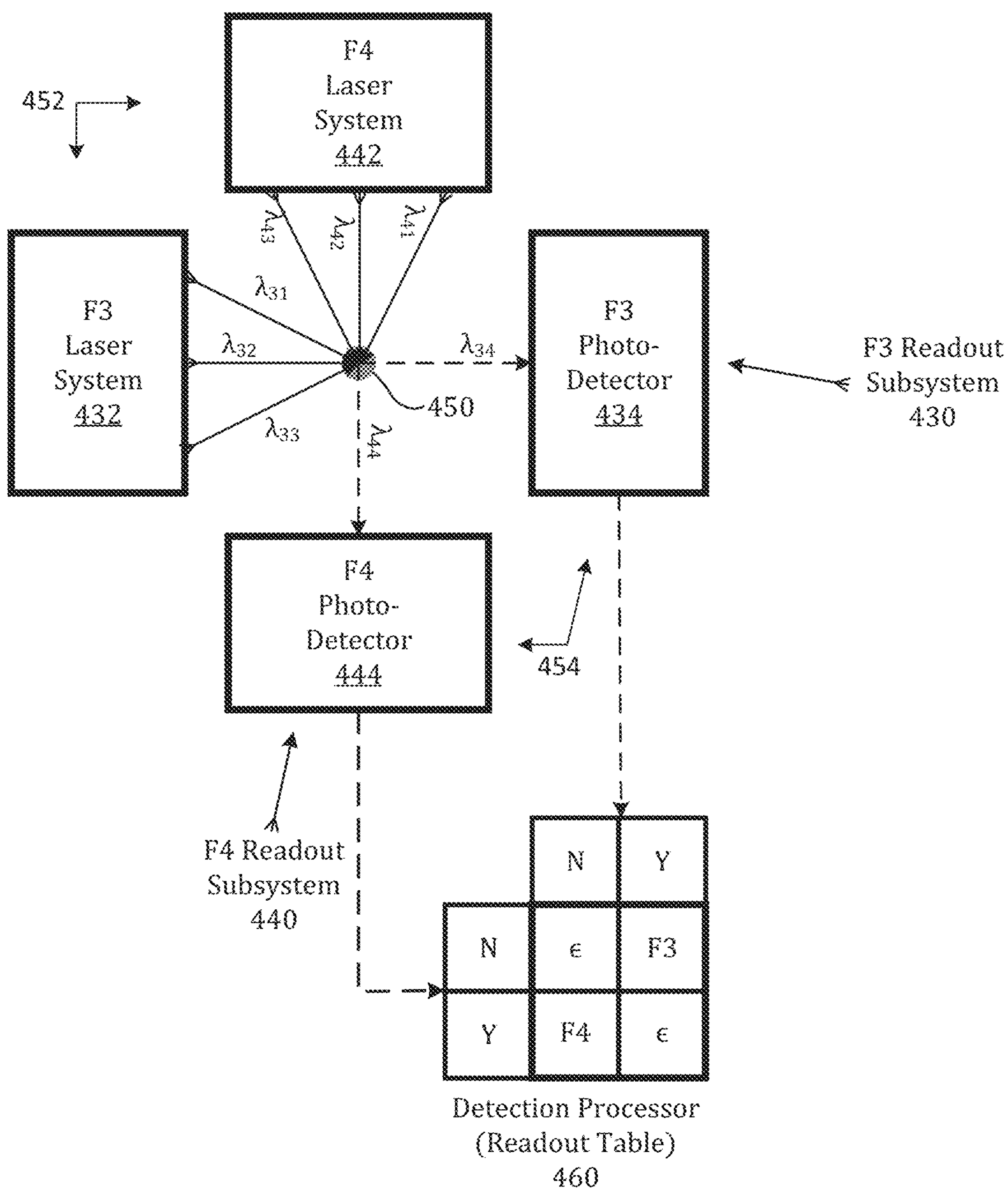
FIG. 4 is a schematic illustration of a quantum-state readout system using two four-wave mixing systems, one for each of two quantum states representing binary values.

The stimulated emissions associated with four-wave mixing is that the wavelength $\lambda_4$ is highly directional so that an appropriately positioned photodetector can detect substantially all $\lambda_4$ photons emitted by the atom. The directional character of the $\lambda_4$ emission follows from the law of conservation of momentum as explained with reference to FIG. 4, which shows momentum vectors $p_1$, $p_2$, $p_3$, and $p_4$ respectively for wavelengths $\lambda_2$, $\lambda_3$, and $\lambda_4$ for a case where $\lambda_1$=1040 nanometers (nm), $\lambda_2$=1061 nm, $\lambda_3$=459 nm, and $\lambda_4$=455 nm. The magnitude of $p_1 \propto 1/\lambda_i$ (for i=1, 2, 3, 4) so the momentum is larger for shorter wavelengths. Assuming momentum is not lost or gained by the atom itself, the conservation of momentum requires $p_4=p_1+p_2+p_3$, i.e., $\lambda_4$ is the resultant of the vector sum of $\lambda_1$, $\lambda_2$, $\lambda_3$.

Accordingly, photodetector 104 can be placed along the predetermined path for wavelength $\lambda_4$. In this position, photodetector 104 is out of the path of wavelengths $\lambda_1$, $\lambda_2$, and $\lambda_3$ so these illuminating wavelengths should contribute at most very little noise to the detection of wavelength $\lambda_4$. Further noise reduction can be achieved by using an infrared (IR) rejecting filter 302 to spectrally filter out the infrared wavelengths, i.e., $\lambda_1$=1040 nm and $\lambda_2$=1061 nm, so that they do not reach photodetector 104. Since $\lambda 3$=459 nm and $\lambda_4$=455 nm are too close (both being blue) to be separated by spectral filtering, the directions of the illuminating wavelengths should be chosen to minimize the amount of scattered $\lambda 3$=459 nm light reaching photodetector 104.

Accordingly, the four-wave-mixing readout method can produce substantially higher (10-100×) photon flux on the detector because four-wave mixing light is much more directed than fluorescence which is emitted in all directions. Typical practical imaging systems can collect only fraction of fluorescence light (~1-10%) due to limited collection solid angle. FWM light field solid angle is much smaller and hence can be fully captured by those imaging systems resulting in 10-100× higher photons detected and hence requiring 10-100× less time to detect the same number of photons.

In contrast to the directionality of four-wave mixing emissions, fluorescent emissions are not at all directional. Since the absorption of illumination photons occurs at different times than the emissions of the fluorescence photons, for the purposes of conservation of momentum, the absorption and the fluorescence are independent events. The absorption must conform to conservation of momentum without taking into account the subsequent momentum of the fluorescence photon. Likewise, the fluorescence must conform to conservation of momentum without considering, the momenta of the illumination photons. Since the momentum of the fluorescence is not dependent on the momentum (momenta) of the illumination and vacuum modes are isotropic, it is free to have any direction.

Since a fluorescence photon can be transmitted in any direction, a detector would have to surround the atom from all angles to capture all fluorescence photons. In most contexts, such a detector would be infeasible. For example, the illumination lasers would have to be placed within the detector or would have to transmit illumination through the detector to reach the atom or atoms. On the other hand, a less encompassing detector, such as photodetector 104, would only be able to capture a small fraction of the emitted fluorescence photons. Thus, a longer detection period would be required to compensate for a weaker signal; the longer detection period would impair performance and the weaker signal would be more subject to noise.

In both the absorption events and the emissions events associated with fluorescence detection, momentum is conserved by recoil motion of the atom. Depending on the context, these recoils can perturb the atom's quantum state, possibly eject the atom from its site, and heat the atom. These effects may or may not be harmful in a given context, but they are almost never desirable as they degrade critical performance metrics of the device (e.g. quantum gates fidelity). Thus, in comparison with fluorescence detection, four-wave mixing readout achieves faster performance, stronger signals, less noise, and fewer ill effects due to atoms recoiling.

In cold atom quantum computing, readout of atoms in respective quantum register sites is required. As there can be a large number of atoms, there is a risk that an atom will vacant its site. In view of this risk, it cannot be assumed that a site that does not have an atom in one state (e.g., F=3 state of $^{133}$Cs) must have an atom in another state (e.g., F=4 of $^{133}$Cs) of interest. To address this risk, a quantum-state readout system 500 provides for positive/bright identifications of a first state (e.g., F=3 state of $^{133}$Cs) and of a second state (e.g., F=3 state of $^{133}$Cs) while a negative/dark detection indicates an error condition.

Quantum-state readout system 400 includes an F=3 readout subsystem 430 and an F=4 readout system 440 designed for reading out $^{133}$Cs atom 450. F=3 readout subsystem 430 includes a laser system 432 and a photodetector 434, while F=4 readout subsystem 440 includes a laser system 442 and a photodetector 444. From a higher-level perspective, quantum-state readout system 400 includes a laser system 452, which includes laser systems 432 and 442, as well as a photodetector system 454, which includes photodetectors 434 and 444.

F=3 laser system 432 outputs wavelengths $\lambda_{31}$, $\lambda_{32}$, and $\lambda_{33}$. These wavelengths and their respective directions are chosen so that atom 450 will emit a wavelength $\lambda_{34}$ in a direction to be detectable by F=3 photodetector 434 provided $^{133}$Cs atom 450 is in its F=3 state. F=4 laser system 442 outputs wavelengths $\lambda_{41}$, $\lambda_{42}$, and $\lambda_{43}$. These wavelengths and their respective directions are chosen so that atom 450 will emit a wavelength $\lambda_{44}$ in a direction to be detectable by F=4 photodetector 444 provided $^{133}$Cs atom 450 is in its F=4 state.

Figure 5:
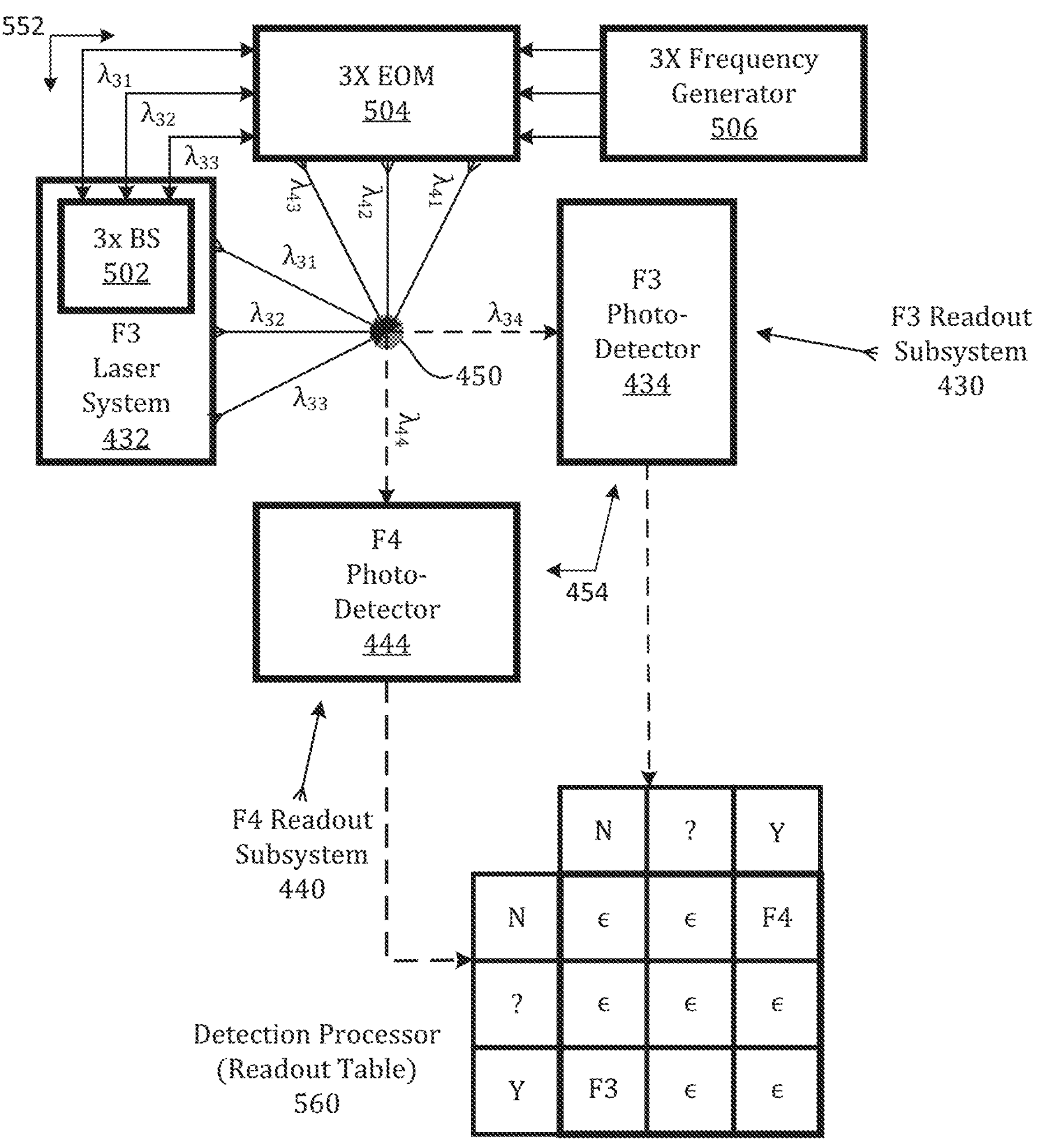
FIG. 5 is a schematic illustration of a quantum-state readout system using a time multiplexed four-wave mixing system providing for positive detection for each of two quantum states representing binary values.

The detection signals output by photodetectors 434 and 444 are transmitted to a detection processor, represented in FIG. 5 by a readout table 460. As indicated by table 460, detection from F=3 photodetector 434 coupled with a non-detection from F=4 photodetector 444 indicates that the $^{133}$Cs atom 450 was in its F=3 state, e.g., representing a logic 0. A detection from F=4 photodetector 544 coupled with a non-detection from F=3 photodetector 434 indicates that $^{133}$Cs atom 450 was in its F=4 state, e.g., representing a logic 1. Non-detections from both photodetectors 434 and 444 indicate an error condition such as a missing atom. Affirmative detections from both photodetectors 434 and 444 also indicate an error condition. In case a series of atoms is to be interrogated, a binary string can be obtained to be interpreted according to context.

A quantum state readout system 500, shown in FIG. 5, is a variation on quantum-state readout system 400 but obviates the need for a separate laser system (e.g., F=4 laser system 442 in FIG. 4) to handle a second state of interest. F=3 laser system 432 is modified to include three beam splitters 502, which provide copies of wavelengths $\lambda_{31}$, $\lambda_{32}$, and $\lambda_{33}$. These wavelengths are input into a set of three respective electro-optical modulators 504 which detunes wavelengths $\lambda_{31}$, $\lambda_{32}$, and $\lambda_{33}$ by amounts determined by respective frequencies received by 3× frequency generator 506. This detuning results respectively in wavelengths $\lambda_{41}$, $\lambda_{42}$, and $\lambda_{43}$. System 500 employs a 3-level readout table 560, taking into account that some intermediate photodetection results may not qualify as a clear Yes or No. As shown, all but two combinations of readouts represent error conditions. In other respects, system 500 is the same as system 400. Laser system 432, 3× EOM 504, and 3× frequency generator 506 can be seen as constituting a laser system 552.

Another quantum-state readout system, not illustrated, employs only one laser system and one photodetector. The laser system includes the 3× EOM and 3× frequency generator of system 500. In this embodiment, the frequency generator oscillates between two frequencies (or between off and on) so as to time multiplex the illumination and mixed wavelengths. The photodetector output is demultiplexed to separate readings for the different quantum states (e.g., F=3 and F=4 for $^{133}$Cs).

Figure 6:
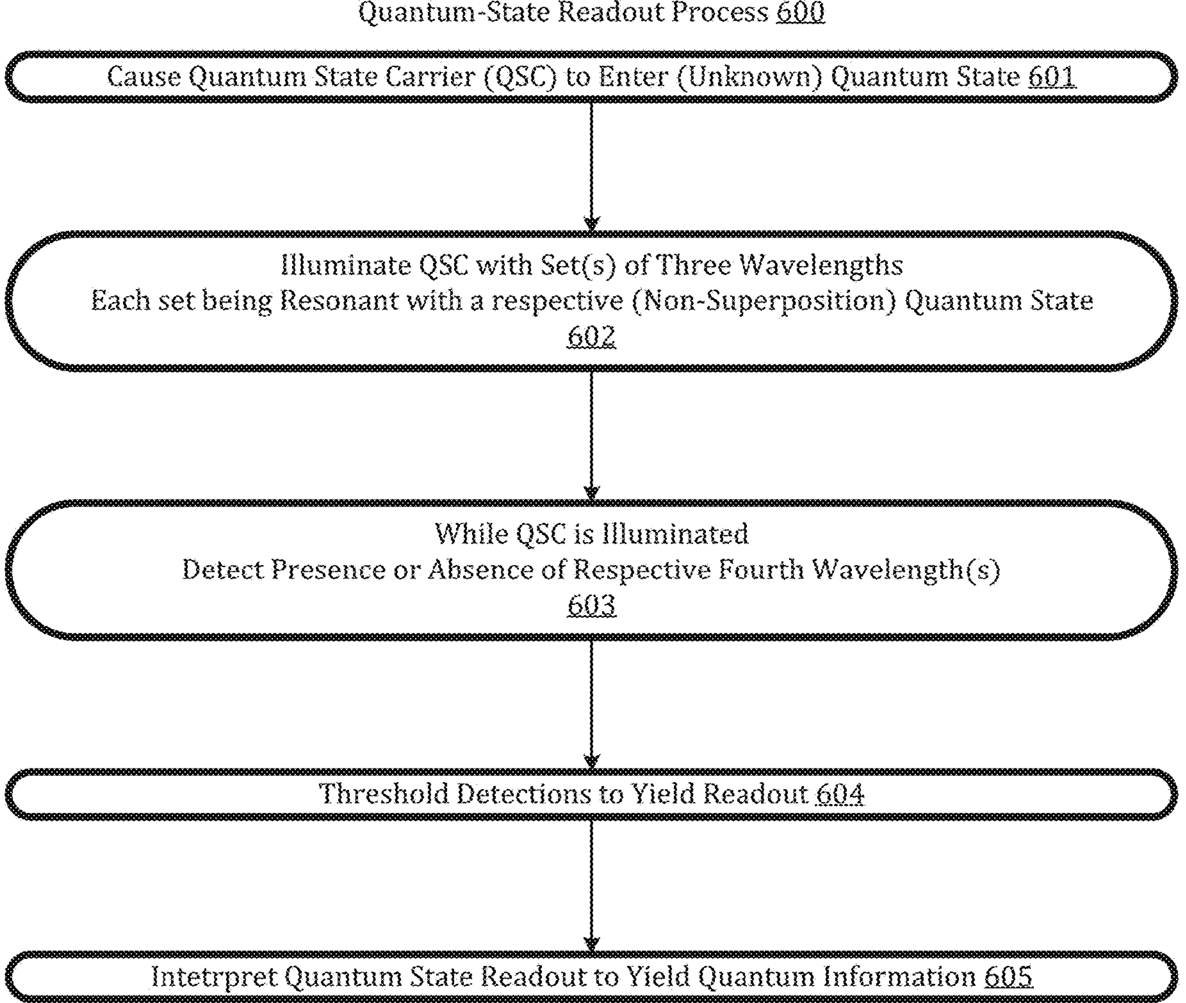
FIG. 6 is a flow chart of a quantum-state readout process implementable in the systems of FIG. 1, FIG. 5, and FIG. 6 and in other systems.

A quantum-state readout process 600, flow charted in FIG. 6, can be implemented in the illustrated quantum-state readout systems and in other systems. At 601, a four-wave mixing quantum-state carrier (QSC) is made to enter a quantum state, typically an unknown quantum state. Herein, a "quantum-state carrier" or "QSC" is any entity that can assume two or more quantum states and superpositions of those quantum states. QSCs can be atoms, other molecular entities, quantum dots, superconducting circuits, photons, virtual counterparts thereof, and other entities. Herein, the QSCs of interest are those that can serve as four-wave mixers. QSCs can represent units of quantum information, e.g., qubits and other qudits. (Herein, a "qubit" is a unit of quantum information that can be represented by complex values x meeting the criterion $$x_R^2 + x_i^2 = 1,$$

where $x_R$ is the real component of x and $x_i$ is the imaginary component of x; a "qunit" is a value from a set of a positive integer number n non-superposition values and superpositions thereof.)

In quantum computing, the quantum states of QSCs are manipulated as the QSCs are made to interact. Typically, the quantum-computation result is unknown before it is read out. The readout process causes superposition states to collapse so that what is read out are non-superposition QSC states, which represent classical realizations of quantum values. The superposition value resulting from a quantum computation can be approximated by repeating the quantum computation a large number of times to obtain a statistical distribution of readout results.

At 602, the FWM-QSC (four-wave mixing quantum-state carrier) is illuminated, e.g., using laser light, with one or more sets of at least three wavelengths. Quantum-state readout system 100 (FIG. 1) employs one set of three wavelengths to positively detect one quantum state. Quantum-state readout systems 500 (FIG. 5) and 600 (FIG. 6) each employ two sets of three wavelengths to positively detect two different quantum states. Additional illumination sets of three wavelengths can be used to positively distinguish three or more quantum states.

At 603, while the QSC is being illuminated by an illumination set of three wavelengths, a photodetector is used to detect the presence or absence of respective emissions of a fourth wavelength. Since four-wave mixing stimulates emission of the fourth wavelength, the four wavelengths occur concurrently. One readout from one photodetector can indicate the presence or absence of one quantum state. One readout form each of two or more photodetectors can indicate the presence or absence of a like number of quantum states. In a time-multiplexed system, plural readouts from a single photodetector can indicate the presence or absence of a like plurality of quantum states.

At 604, one or more photodetector readouts are interpreted to characterize one or more respective quantum states. Some photodetectors output analog or digital detection-intensity levels that are then thresholded to distinguish a positive detection indicating presence of a respective quantum state from a negative detection indicating a absence of the respective quantum state. Separate thresholds can be used for presence and absence so that both can be distinguished from ambiguous intermediate photodetector outputs. Ambiguous readings can, for example, be treated as error conditions. Concurrent positive detections of two or more inconsistent states can also be treated as an error condition.

At 605, the quantum-state determinations resulting from 604 can themselves be interpreted and, in some cases, consolidated, to yield quantum information. For example, the quantum states can be interpreted as an answer to a question or a solution to a problem addressed by a quantum computation.

Herein, a "quantum-state carrier" or "QSC" is s system capable of transition between or among two or more distinct pure quantum states as well as mixtures of pure quantum states. Examples of QSCs including charged and neutral molecular entities, superconducting electronic circuits, quantum dots, and nitrogen-vacancy centers in a diamond lattice. More specifically, neutral and charged rubidium, cesium, strontium, and yttrium atoms can serve as QSCs. Herein, "molecular entity" is used as defined in the International Union of Pure and Applied Chemistry (IUPAC) Goldbook to mean: "Any constitutionally or isotopically distinct atom, molecule, ion, ion pair, radical, radical ion, complex, conformer etc., identifiable as a separately distinguishable entity."

QSCs of interest herein are physical systems with optical non-linearity to generate four-wave-mixing. Herein, "four-wave mixing" mixing with three or more wavelengths to obtain an additional wavelength. Any N-wave-mixing is possible as long as the system has a good nonlinearity to support the N process.

Herein, "electromagnetic radiation" (EMR) spans wavelengths from 1 picometer (pm) to 100 kilometers (km). The wavelengths of most interest for QSCs in the form of molecular entities are within the 100-10,000 nm range encompassing near ultraviolet, visible, and near infrared light.

Herein, "cold" refers to temperatures below 1 milliKelvin (1 mK), and "ultra-cold" characterizes particle temperatures below 100 μK (a typical Doppler cooling limit). Depending on the embodiment, the ultra-cold particles can further be below 100 nanoKelvin (nK). For example, in an exemplary BEC, the temperature can be about 50 nK. Herein, "ultra-high vacuum" and "UHV" refer to pressures below $10^{-9}$ Torr.

Herein, art labelled "prior art, if any, is admitted prior art; art not labelled "prior art", if any, is not admitted prior art. The illustrated embodiments, variations thereupon and modifications thereto are provided for by the present invention, the scope of which is defined by the following claims.

What is claimed is:

1. A quantum-state readout system comprising:

a laser system for illuminating a quantum-state carrier (QSC) with electromagnetic radiation (EMR) including at least one illumination set of at least three different wavelengths configured to cause the QSC to emit EMR of an emissions wavelength via four-wave mixing while the QSC is illuminated by the at least one illumination set, wherein the at least one illumination set comprises a first illumination set including the at least three different wavelengths, and a second illumination set including a plurality of additional wavelengths configured to cause the QSC to emit EMR of a second emissions wavelength via four-wave mixing while the QSC is illuminated by the second illumination set;

a photodetector system configured to:

generate a first emission determination indicating whether or not EMR of the emissions wavelength, different from each of the at least three different wavelengths of the at least one illumination set, has been detected; and generate a second emission determination indicating whether or not EMR of the second emissions wavelength has been detected; and a readout processor for identifying a quantum state of the QSC based on the emission determination configured to:

determine that the QSC was in a first quantum state when the first emission determination indicates that EMR of the emissions wavelength has been detected; and determine that the QSC was in a second quantum state when the second emission determination indicates that EMR of the second emissions wavelength has been detected.

2. The quantum-state readout system of claim 1 wherein, the QSC is a four-wave-mixing capable molecular entity, the EMR is in the form of laser beams, and the wavelengths are between 100 nm and 10,000 nm.

3. The quantum-state readout system of claim 1 wherein the first quantum state is interpreted as a logic 0 and the second quantum state is interpreted as a logic 1.

4. The quantum-state readout system of claim 1 wherein the QSC is a cold neutral alkali metal or alkaline-earth-metal atom.

5. The quantum-state readout system of claim 4 wherein the QSC is a rubidium, cesium, or strontium atom.

6. The quantum-state readout system of claim 1, wherein the at least three different wavelengths are configured to cause the QSC to emit the EMR of the emissions wavelength only when EMR at each of the at least three different wavelengths are concurrently illuminating the QSC.

7. The quantum-state readout system of claim 1, wherein a direction of the EMR of the emissions wavelength results from a combination of momentum vectors for the EMR at each of the at least three different wavelengths.

8. The quantum-state readout system of claim 1, wherein the EMR of the emissions wavelength is emitted anisotropically.

9. A method comprising:

illuminating, using a laser system, a quantum-state carrier (QSC) with electromagnetic radiation (EMR) including at least one illumination set of at least three different wavelengths configured to cause the QSC to emit EMR of an emissions wavelength via four-wave mixing while the QSC is illuminated by the at least one illumination set, wherein the at least one illumination set comprises a first illumination set including the at least three different wavelengths, and a second illumination set including a plurality of additional wavelengths configured to cause the QSC to emit EMR of a second emissions wavelength via four-wave mixing while the QSC is illuminated by the second illumination set;

generating, using a photodetector system, a first emission determination indicating whether or not EMR of the emissions wavelength, different from each of the at least three different wavelengths of the at least one illumination set, has been detected; and generating, using the photodetector system, a second emission determination indicating whether or not EMR of the second emissions wavelength has been detected; and determining, using a readout processor, that the QSC was in a first quantum state when the first emission determination indicates that EMR of the emissions wavelength has been detected; and determining, using the readout processor, that the QSC was in a second quantum state when the second emission determination indicates that EMR of the second emissions wavelength has been detected.

10. The method of claim 9, wherein at least a first wavelength of the at least three different wavelengths of the first illumination set is directed onto the QSC from an opposing side of the QSC from the photodetector system.

11. The method of claim 9, wherein the QSC is a single atom of rubidium, cesium, or strontium.

12. The method of claim 9, wherein each of the at least three different wavelengths of the first illumination set is between 100 nm and 10,000 nm.

13. The method of claim 9, wherein the QSC is a physical system with optical non-linearity to generate four-wave-mixing.

14. The method of claim 13, wherein the QSC is a neutral atom or an ion.

15. The method of claim 9, wherein the first quantum state is interpreted as a logic 0 and the second quantum state is interpreted as a logic 1.

16. The method of claim 9, wherein the QSC is a cold neutral alkali metal or alkaline-earth-metal atom.

* * * * *